United States Patent [19]
Rebucci

[11] 3,743,913
[45] July 3, 1973

[54] MECHANISM FOR ELECTRICALLY TRANSMITTING THE SPEED OF TRAVEL OF A CONVEYOR BELT

[75] Inventor: Eugene L. Rebucci, Union City, N.J.

[73] Assignee: Merrick Scale Mfg. Company, Passaic, N.J.

[22] Filed: Feb. 24, 1972

[21] Appl. No.: 229,238

[52] U.S. Cl. ............... 318/327, 74/242.11, 198/39
[51] Int. Cl. ........................................... G01p 3/02
[58] Field of Search ................. 318/326, 327, 328, 318/312, 314, 318; 33/129, 132; 226/42; 74/242.11 R, 242.8, 242.9, 242.10, 11, 12; 310/68; 200/61.13; 317/5; 198/203, 184, 39

[56] References Cited
UNITED STATES PATENTS

| | | | |
|---|---|---|---|
| 2,882,036 | 4/1959 | Lyons | 198/39 X |
| 2,999,295 | 9/1961 | Manning et al. | 318/312 X |
| 3,539,085 | 11/1970 | Anderson et al. | 226/42 X |
| 2,139,397 | 12/1938 | Wigglesworth | 74/242.11 R |

*Primary Examiner*—J. D. Miller
*Assistant Examiner*—Robert J. Hickey
*Attorney*—John A. Seifert

[57] ABSTRACT

The speed of travel of a conveyor belt is electrically transmitted to a weighing system by a unitary mechanism mounted relative to the conveyor belt and including a friction wheel contacting the conveyor belt under pressure to be rotated at a speed proportional to the speed of travel of the conveyor belt and a pulser wheel rotated by the traction wheel in proximity to an induction coil generating digital speed signals.

4 Claims, 3 Drawing Figures

Patented July 3, 1973

MECHANISM FOR ELECTRICALLY TRANSMITTING THE SPEED OF TRAVEL OF A CONVEYOR BELT

The object of the invention is to produce an accurate digital speed signal by a unitary mechanism mounted relative to a conveyor belt and thereby eliminating transmission of the speed of travel of the conveyor belt to mechanism for generating a digital speed signal located at a point remote from the conveyor belt.

The invention comprises a first casing mounted adjacent to the conveyor belt and arranged with an induction coil juxtaposed to a pulser wheel rotatably supported by said casing and connected to a train of gears of a predetermined ratio mounted in a second casing pivotally supported by the first casing. A traction wheel is rotatably carried by the second casing and operatively connected to the train of gears whereby rotation of the traction wheel will be transmitted by the train gears to the pulser wheel which activates the induction coil to generate digital speed signals. The first casing is mounted to position the traction wheel in contact with the conveyor belt and the traction wheel is yieldingly urged into contact with the conveyor belt by a helical spring having the ends anchored in the first and second casings. The first casing is provided with a plurality of holes into which the end of the spring anchored in said first casing may be positioned to increase or decrease the pressure applied to the traction wheel.

In the drawings accompanying and forming a part of this application:

Figure 1:
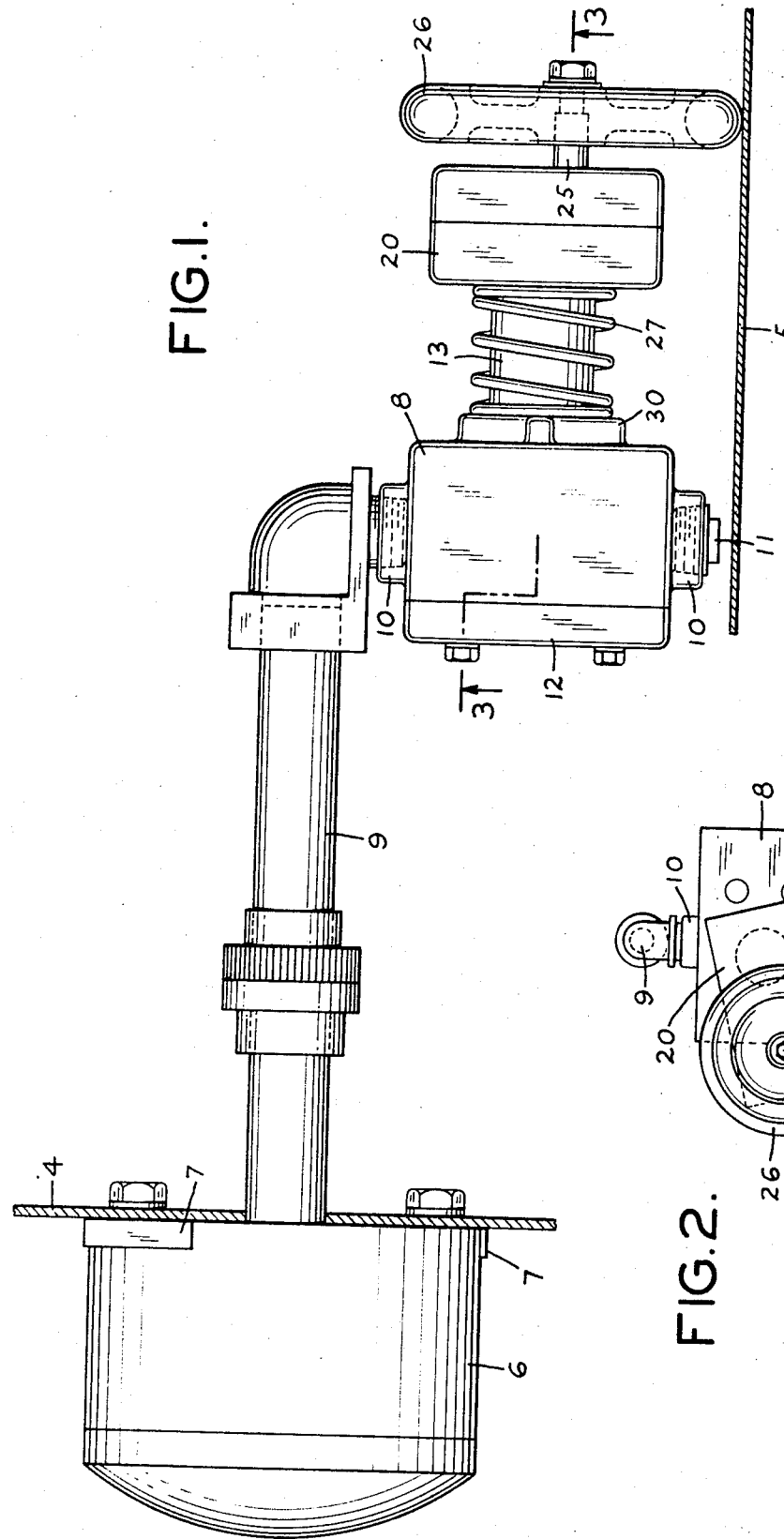
FIG. 1 is an elevational view of the unitary mechanism.
Figure 2:
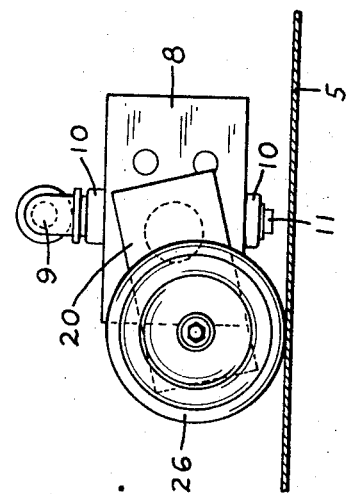
FIG. 2 is an end view of the two casings and traction wheel, on a reduced scale, looking at the right hand side of FIG. 1.

The embodiment of the invention is mounted on the supporting structure, as indicated at 4 in FIG. 1, of a conveyor belt 5, as shown in FIGS. 1 and 2.

An electric conductor terminal box 6 is secured to the structure 4 by bolts engaged in ears extended from the box, as shown at 7 in FIG. 1.

Figure 3:
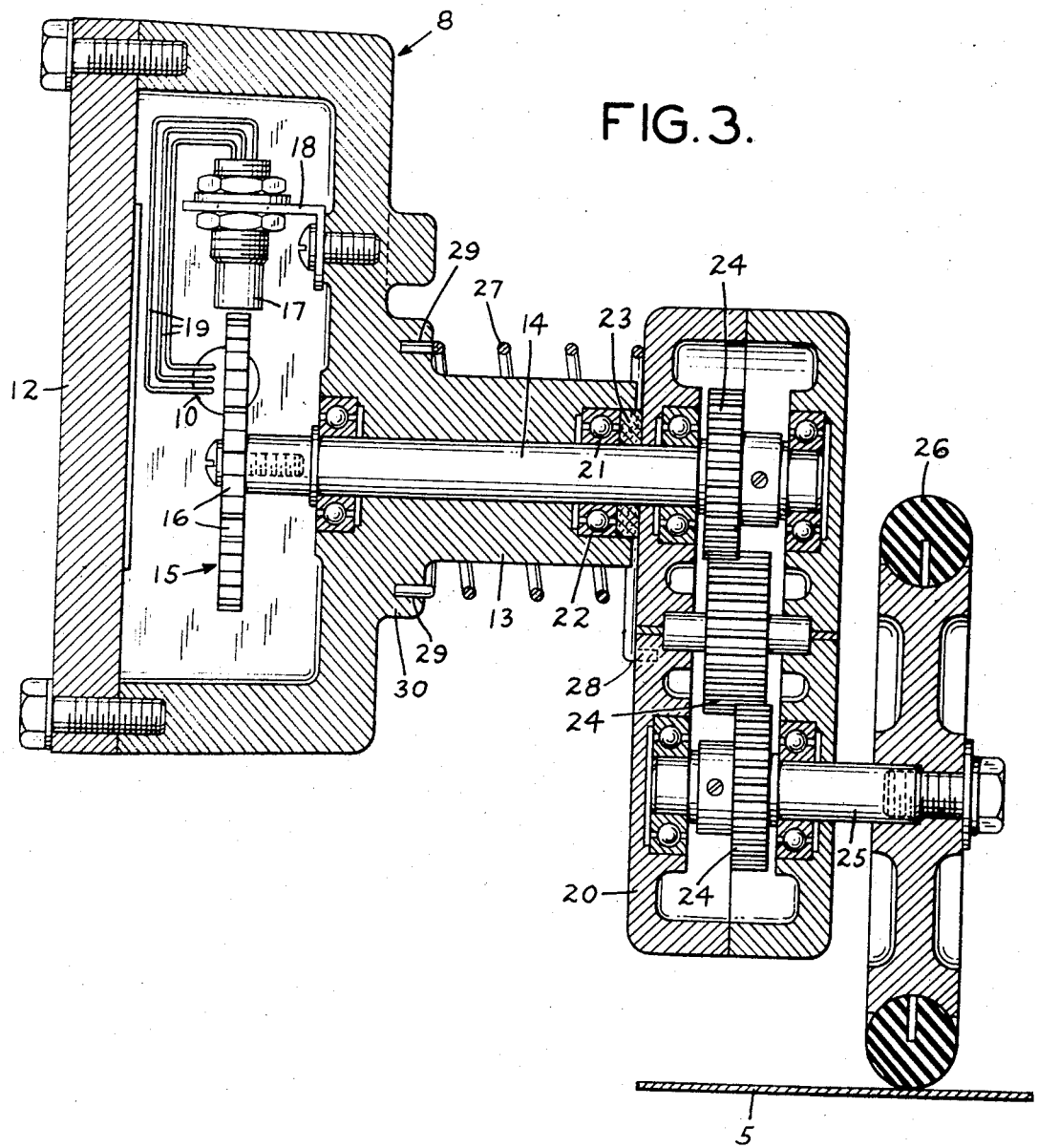
FIG. 3 is a sectional view, on an enlarged scale, taken on the line 3—3 of FIG. 1 looking in the direction of the arrows.

A first casing 8 is connected to and supported by the structure 4 and the terminal box 6 by a coupling 9. The first casing 8 is provided with bosses 10 in the top and bottom walls thereof for connection with the coupling 9. The boss 10 not being used is closed by a plug 11, as shown in FIGS. 1 and 2. The casing 8 is closed by a cover 12 and the wall of the casing 8 opposite the cover 12 is provided with a tubular protuberance 13 for rotatably supporting a shaft 14 having one end portion extended into the first casing 8 and having a nickel plated pulser wheel 15 secured thereto. The periphery of the pulser wheel 15 is provided with a predetermined number of equidistantly spaced teeth 16, as shown in FIG. 3, travelling pass an induction coil 17 adjustably mounted in a bracket 18 secured to the wall of the casing provided with the protuberance 13. The induction coil 17 is provided with a predetermined number of electric conductors 19, shown as three in number, which are passed through the boss 10 and the coupling 9 into the terminal box 6.

The tubular protuberance 13 pivotally supports a second casing 20 by a ball bearing race 21 in a recess 22 in the end of the protuberance 13 and rotatably supporting the shaft 14. A felt washer 23 is in the recess 22 between the ball bearing race 21 and the casing 20 to dust seal the connection between the casings 8 and 20. The second casing 20 is provided with a train of gears 24 of a predetermined ratio connecting the shaft 14 to a shaft 25 rotatably supported by the casing 20 and provided with a traction wheel 26 yieldingly urged against the conveyor belt 5 by a helical spring 27 coiled around the protuberance 13 and having one end anchored in the casing 20, as at 28 in FIG. 3, and the opposite end of the spring 27 is adapted to be engaged in a hole of an annular series of holes 29 equidistantly spaced in a shoulder 30 of the casing 8 circumscribing the protuberance 13. The series of holes 29 are provided to vary the force applied to the traction wheel 26 and maintain the proper contact between the traction wheel 26 and the conveyor belt 5.

Having thus described my invention, I claim:

1. Mechanism for electrically transmitting the speed of travel of a conveyor belt of a weighing system, comprising a first casing mounted relative to the conveyor belt, a pulser wheel rotatably mounted in the first casing, a second casing pivotally supported by the first casing, a traction wheel rotatably supported by the second casing, a train of gears of predetermined ratio enclosed by the second casing and operatively connecting the traction wheel to the pulser wheel, and an induction coil supported by the first casing in proximity to the periphery of the pulser wheel to generate digital speed signals representing the speed of travel of the conveyor belt.

2. Mechanism for electrically transmitting the speed of travel of a conveyor belt as claimed in claim 1, a spring anchored to the first and second casings and arranged to maintain the traction wheel in contact with the conveyor belt.

3. Mechanism for electrically transmitting the speed of travel of a conveyor belt as claimed in claim 2, wherein the first casing is provided with a tubular protuberance for pivotally supporting the second casing and confining the spring, and a shaft rotatably supported in the protuberance and connecting the train of gears to the pulser wheel.

4. Mechanism for electrically transmitting the speed of travel of a conveyor belt as claimed in claim 2, wherein the first casing is provided with an annular series of spaced holes for anchoring one end of the spring to vary the tension of the spring.

* * * * *